(12) United States Patent
Ikeda et al.

(10) Patent No.: US 7,461,625 B2
(45) Date of Patent: Dec. 9, 2008

(54) LUBRICANT RECOVERING APPARATUS FOR HEAVY CONSTRUCTION EQUIPMENT

(75) Inventors: Toshimichi Ikeda, Changwon (KR); Chan Joo Na, Changwon (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 24 days.

(21) Appl. No.: 11/809,378

(22) Filed: Jun. 1, 2007

(65) Prior Publication Data
US 2007/0289297 A1 Dec. 20, 2007

(30) Foreign Application Priority Data
Jun. 19, 2006 (KR) ...................... 10-2006-0054881

(51) Int. Cl.
*F01M 1/02* (2006.01)
(52) U.S. Cl. ..................................... 123/196 R; 60/311
(58) Field of Classification Search ............. 123/196 R; 60/274, 311
See application file for complete search history.

(56) References Cited

U.S. PATENT DOCUMENTS 3,754,399 A * 8/1973 Ono et al. ...................... 60/311

* cited by examiner

*Primary Examiner*—Noah Kamen
(74) *Attorney, Agent, or Firm*—Ladas & Parry LLP

(57) ABSTRACT

A lubricant recovering apparatus is disclosed, which can process lubricant collected in a drain pipeline due to an oil slobbering phenomenon occurring in a diesel engine. The lubricant recovering apparatus includes a tail pipe connected to an engine of the heavy construction equipment for discharging an exhaust gas, a tap installed at a bottom point of the tail pipe, a first pipe connected to the tap at one end thereof, a joint member detachably connected to the other end of the pipe, a second pipe mounted on a lower end of the joint member and extending to an interior of an oil reservoir, a penetrating portion having a hole formed on an upper portion of the oil reservoir, through which the tail pipe passes, and a drain port formed on a lower end of the second pipe penetrating the penetrating portion and having a mesh.

6 Claims, 5 Drawing Sheets

LUBRICANT RECOVERING APPARATUS FOR HEAVY CONSTRUCTION EQUIPMENT

CROSS-REFERENCE TO RELATED APPLICATION

This application is based on and claims priority from Korean Patent Application No. 10-2006-0054881, filed on Jun. 19, 2006 in the Korean Intellectual Property Office, the disclosure of which is incorporated herein in its entirety by reference.

BACKGROUND OF THE INVENTION

1. Field of the Invention

The present invention relates to a lubricant recovering apparatus capable of processing lubricant collected in a drain pipeline due to an oil slobbering phenomenon occurring in a diesel engine.

2. Description of the Prior Art

In recent years, diesel engines widely adopt a turbocharger for increasing an air amount at combustion in order to enhance its performance and decrease an exhaust gas. An internal combustion engine is supercharged by the air sucked therein at a pressure higher than atmospheric pressure, so that the internal combustion engine is charged with a lot of air even in the engine of the same displacement. If an amount of fuel injection is increased in proportion to the increased air amount, an output of the engine is boosted up. In order to supply the supercharged air to the engine, a turbine is rotated by use of the flow energy generated when the exhaust gas is discharged, and a blower coupled to the turbine via a rotational shaft is rotated to suck and compress the air. The turbocharger of the construction as described above is widely used to boost the output of the engine.

An oil slobbering phenomenon occurs in the diesel engine. The oil slobbering means that lubricant coming into a combustion chamber beyond a piston ring is not burnt and goes in a tail pipe. Since the pressure acting on the piton ring is decreased due to insufficient explosion pressure in the cylinder when the engine is idling, a sealing effect of the cylinder is lowered, and thus the oil of a crank case is raised.

Such an oil slobbering phenomenon occurs often in the most of diesel engines due to the turbocharger. Especially, if an idle mode is kept for a long time, the oil slobbering becomes conspicuous. More specifically, the pressure in the cylinder is low during the idling, and the pressure acting on the piton ring is decreased, thereby decreasing the sealing effect of the cylinder and thus raising the oil of the crank case. In case of a turbocharged diesel engine, vacuum is partially generated in an intake manifold when the engine runs at a low speed and light load. Thus, the oil flows in a suction valve guide, and the oil is discharged from the tail pipe.

The discharged oil is black, and is discharged outside through the tail pipe and a muffler, which exerts harmful effects on the environments. Also, the oil is often leaked through a clearance of jointed portions provided on the tail pipe. Consequently, in addition to the environmental problem, the engine is darkly polluted with the discharged oil, which gives a driver an unpleasant feeling.

SUMMARY OF THE INVENTION

Accordingly, the present invention has been made to solve the above-mentioned problems occurring in the prior art while advantages achieved by the prior art are maintained intact.

One object of the present invention is to provide a lubricant recovering apparatus capable of preventing oil from being discharged outside even though an oil slobbering phenomenon occurs in a diesel engine.

Another object of the present invention is to provide a lubricant recovering apparatus capable of recycling the oil discharged from a diesel engine to solve an environmental pollution due to an oil slobbering phenomenon.

Still another object of the present invention is to provide a lubricant recovering apparatus capable of preventing the periphery of an engine from being polluted by discharged oil to eliminate an unpleasant feeling of a driver and reduce a time and cost required to clean the engine.

In order to accomplish these objects, there is provided a lubricant recovering apparatus for heavy construction equipment, according to the present invention, which comprises a tail pipe connected to an engine of the heavy construction equipment for discharging an exhaust gas, a tap installed at a bottom point of the tail pipe, a first pipe connected to the tap at one end thereof, a joint member detachably connected to the other end of the pipe, a second pipe mounted on a lower end of the joint member and extending to an interior of an oil reservoir, a penetrating portion having a hole formed on an upper portion of the oil reservoir, through which the tail pipe passes, and a drain port formed on a lower end of the second pipe penetrating the penetrating portion and having a mesh.

Diesel engines employ a turbocharger for increasing an air amount at combustion in order to enhance its performance. A turbine of the turbocharger is rotated by use of an exhaust gas of high temperature and high pressure which is discharged through a tail pipe, and an external air is sucked and compressed by the rotation of the turbine.

Since the explosion pressure in a cylinder is high at a normal case, the cylinder discharges less lubricant. However, since a sealing pressure of the piton ring is low due to insufficient explosion pressure in the cylinder when the engine is idling for a long time, the lubricant may come in the cylinder. The entering lubricant is not completely burned, and is discharged through the tail pipe, which is referred to as an oil slobbering phenomenon.

As the engine is equipped with the turbocharger, it cannot prevent the oil slobbering. Therefore, it is necessary to prevent the exhaust gas from being discharged to atmosphere through the turbocharger rotating at high speed.

In order to solve the above problem, a drain is installed at a bottom point of the tail pipe. In other words, the tail pipe is provided at a bottom point with a recovery pipe for recovering the lubricant. It is preferable that the recovery pipe is installed at the lowest point of a line connecting an exhaust manifold, through which the exhaust gas discharged from a discharge port of the engine passes, the turbocharger, and a muffler connected to the turbocharger, which the lubricant is pooled at the lowest point of the line.

A tap is installed on a lower portion of the tail pipe, and the first pipe is welded to the tap. In this instance, the pipe should be made of a material capable of withstanding high temperature and high pressure. The first pipe has a desired length so as to easily carry out fastening operation after the pipe is installed. The joint member is detachably installed on the lower end of the first pipe. The joint member is a tube interposed between a joint part and a joint. A flange, a union, or a coupling may be used as the joint part. A general pipe or flexible tube may be used as the pipe between the joints. Preferably, the components are made of a material capable of withstanding high temperature and high pressure, since the exhaust gas passing through the turbocharger is highly compressed at high temperature.

The second pipe connected to the lower end of the joint member penetrates the upper cover of the oil reservoir. Consequently, the upper cover of the oil reservoir is provided with a through hole. Since the oil is slopping from side to side when the heavy construction equipment runs, the through hole should be sealed in such a way that the oil is not leaked through the through hole. Consequently, a penetrating portion having a packing should be provided around the second pipe penetrating the through hole.

Preferably, a mesh is provided on the lower end of the second pipe penetrating the oil reservoir, so as to prevent a mass of impurities from entering in the reservoir. If the impurities come in the cylinder together with the oil, the piston ring may be damaged by the impurities. If the piston ring is damaged, the performance of the engine is depreciated. Also, since the lubricant comes in the cylinder through the damaged piston ring, the oil slobbering becomes conspicuous.

According to another aspect of the present invention, there is provided a lubricant recovering apparatus for heavy construction equipment which comprises a tail pipe connected to an engine of the heavy construction equipment for discharging an exhaust gas, a tap installed at a bottom point of the tail pipe, a first pipe connected to the tap at one end thereof, a joint member detachably connected to the other end of the pipe, a second pipe mounted on a lower end of the joint member, and a temporary storage mounted on a lower end of the second pipe.

The construction of the lubricant recovering apparatus will now be described in detail. A recovery pipe is installed at the lowest point of a line connecting an exhaust manifold, through which the exhaust gas discharged from a discharge port of the engine passes, the turbocharger, and a muffler connected to the turbocharger, which the lubricant is pooled at the lowest point of the line.

A tap is installed on a lower portion of the tail pipe, and the first pipe is welded to the tap. In this instance, the pipe should be made of a material capable of withstanding high temperature and high pressure. The joint member is detachably installed on the lower end of the first pipe. The joint member is a tube interposed between a joint part and a joint. A flange, a union, or a coupling may be used as the joint part. Preferably, the components are made of a material capable of withstanding high temperature and high pressure, since the exhaust gas passing through the turbocharger is highly compressed at high temperature.

A general pipe or flexible tube may be used as the pipe between the joints. Preferably, the pipe or flexible tube is made of a material capable of withstanding high temperature and high pressure.

Also, it is required for a support to support the temporary storage which is laid on the upper cover of the oil reservoir or installed in an empty space of the upper cover. This is to prevent the temporary storage from being vibrated due to the rotation of the turbocharger. Alternatively, it can prevent the severe vibration of the temporary storage due to the rotation of the turbocharger, by connecting the temporary storage with the flexible tube. Although the vibration may occur even using the flexible tube, the support fixing the temporary storage is required.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
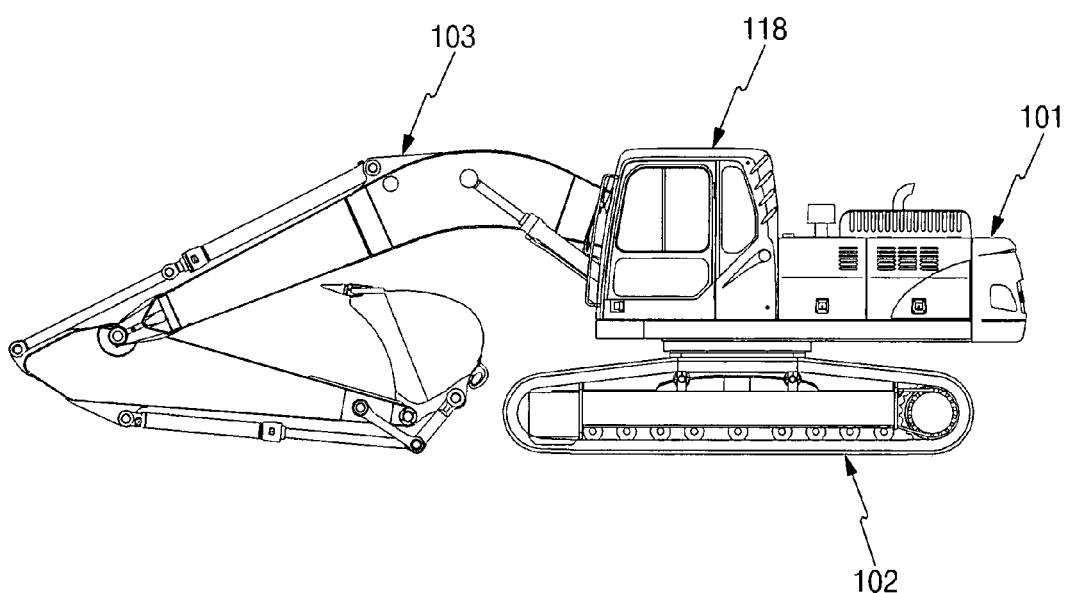
FIG. 1 is a side view of a common excavator.

FIG. 1 is a side view of a common excavator. The excavator includes an upper swing structure 101, a lower driving structure 102, and a working unit 103. Various units for driving the working unit 103 and a cabin 118 are mounted on the upper swing structure.

Figure 2:
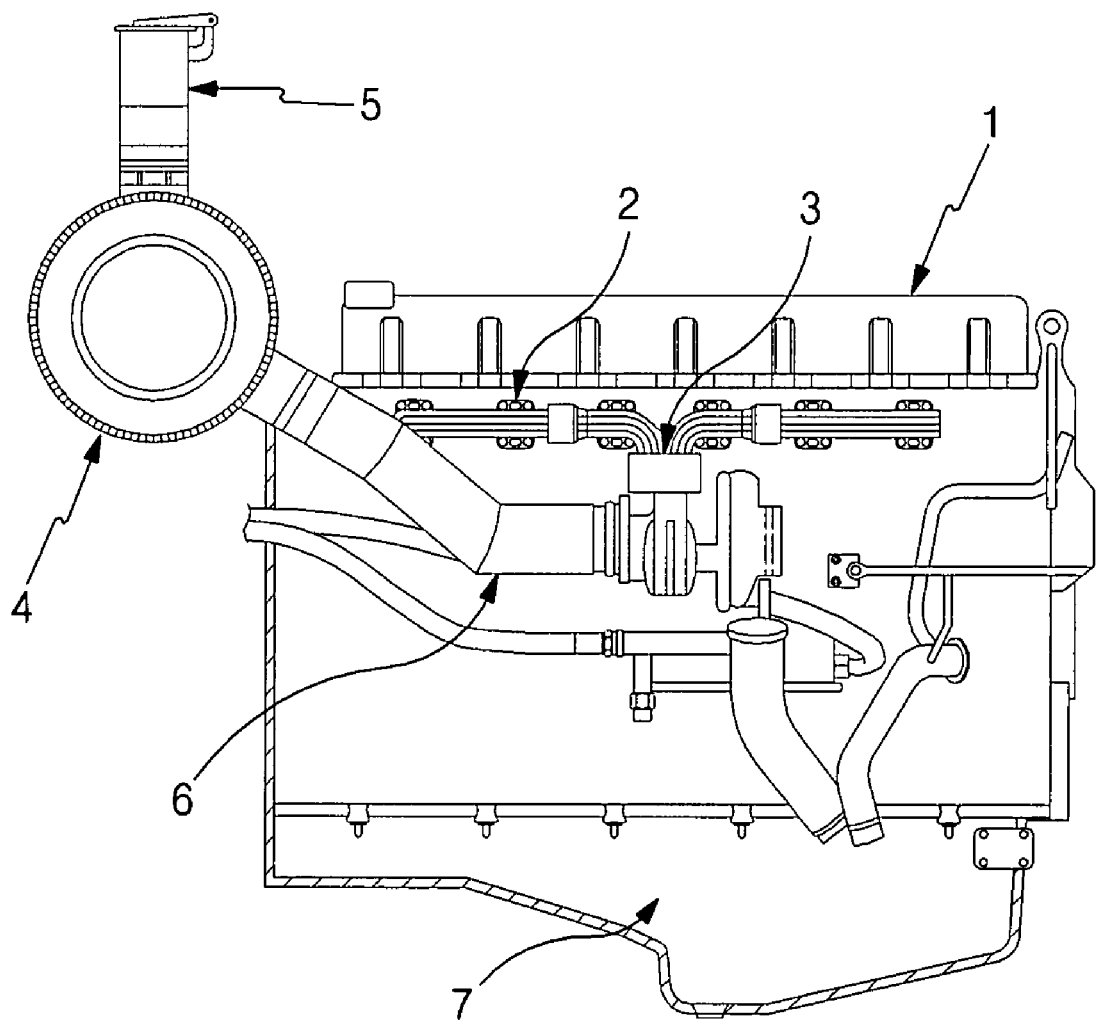
FIG. 2 is a cross-sectional view illustrating the construction of an engine and an exhaust device for use in a common excavator.

FIG. 2 is a cross-sectional view illustrating the construction of an engine and an exhaust device for use in a common excavator, on which a lubricant recovering apparatus of the present invention is mounted. The construction includes an engine 1, an exhaust manifold 2, a turbocharger 3, a muffler 4, a tail pipe 5, a pipe 6 connecting the turbocharger with the muffler, and an oil reservoir 7 positioned under the turbocharger.

Figure 3:
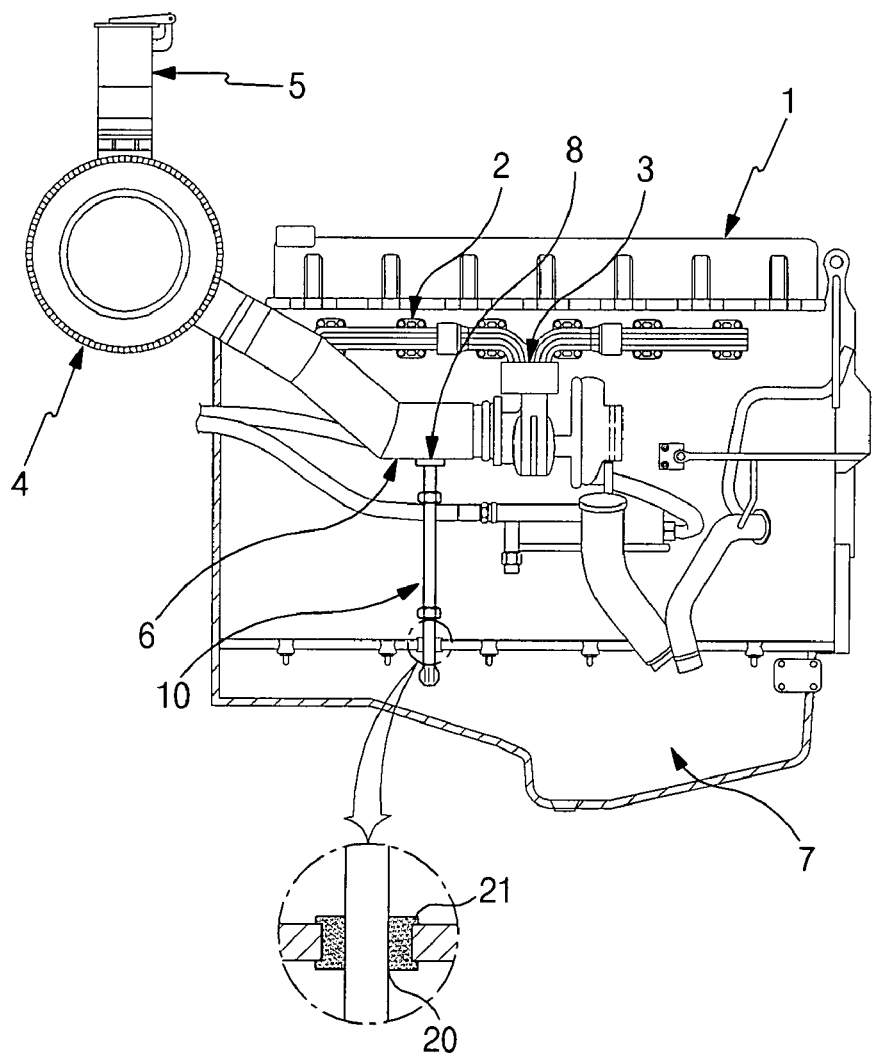
FIG. 3 is a cross-sectional view illustrating the construction of a lubricant recovering apparatus according to an embodiment of the present invention.
Figure 4:
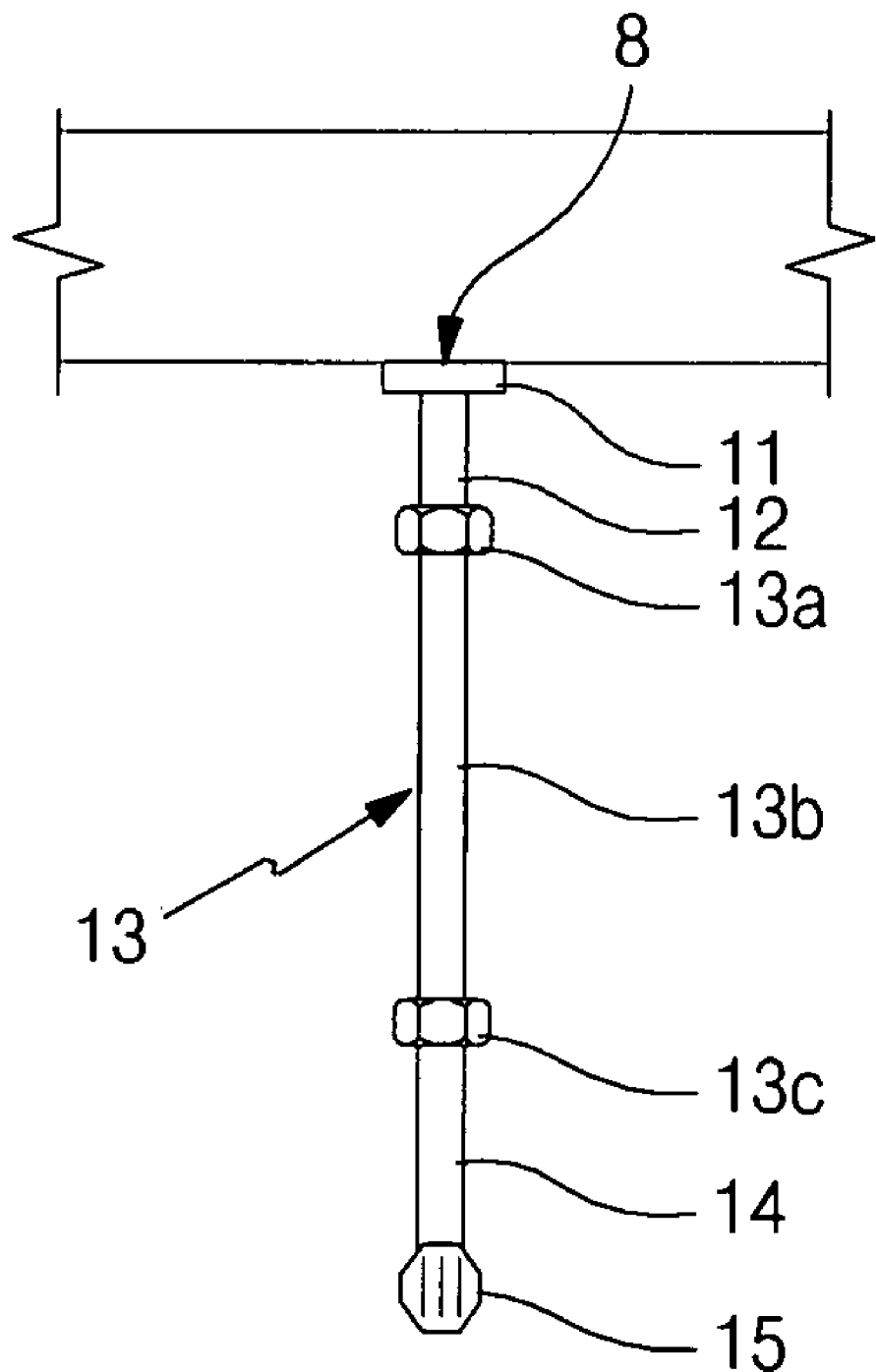
FIG. 4 is a partially enlarged view illustrating the construction of the joint part shown in FIG. 3.

FIG. 3 is a cross-sectional view illustrating the construction of the lubricant recovering apparatus according to an embodiment of the present invention, and FIG. 4 is a partially enlarged view illustrating the construction of the joint part shown in FIG. 3.

Referring to FIG. 3, it can be understood that a tap should be installed at a bottom point from the exhaust manifold to the tail pipe.

FIG. 4 shows parts of the lubricant recovering apparatus. A tap 11 is installed at a bottom point 8 of the tail pipe, and a first pipe 12 having a certain length is connected to the tap so as to easily install the tail pipe. A joint member 13 is connected to a lower end of the first pipe 12. The lower end of the first pipe 12 is provided with a threaded portion so as to connect the lower end with an upper portion of the joint member 13a. A pipe 13b of the joint member 13 is connected to the first pipe 12 by using a pipe or flexible tube. In case of connecting the joint member 13 by using the pipe 13b, unions 13a and 13c are needed for upper and lower portions of the pipe 13b. The unions 13a and 13c are installed on the upper and lower ends of the pipe 13b to connect the first pipe 12 with the second pipe 14. In case of using the flexible tube 13b, bolts are mounted on the upper and lower ends of the pipe 13b to directly connect the first and second pipes 12 and 14.

The second pipe 14 connected to the joint member 13 penetrates the oil reservoir 7. Preferably, the upper penetrating portion 20 of the oil reservoir 7, through which the second pipe 14 penetrates, is provided with a packing 21 so as to prevent leakage of the oil when the excavator moves. Also, a mesh 15 may be installed on an end of the second pipe penetrating the oil reservoir 7, so as to prevent a lump of impurities from entering into the oil reservoir 7. Also, the mesh 15 installed on the end of the second pipe should be periodically maintained.

With the construction, even when the oil is leaked from the tail pipe due to the oil slobbering, the oil can be returned to the engine, without discharging the oil outside.

Figure 5:
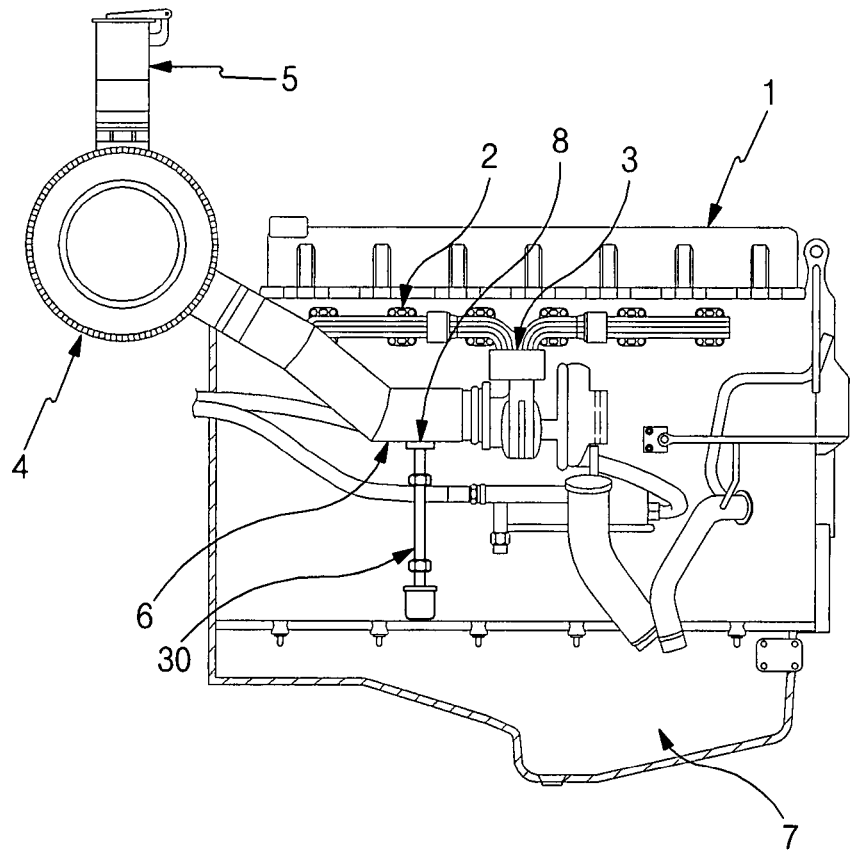
FIG. 5 is a cross-sectional view illustrating the construction of a lubricant recovering apparatus according to an alternative embodiment of the present invention.
Figure 6:
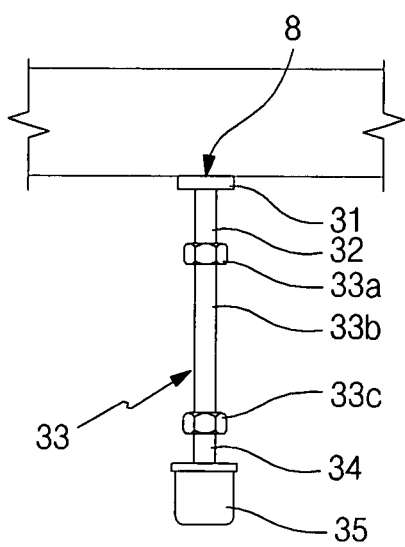
FIG. 6 is a partially enlarged view illustrating the construction of the joint part shown in FIG. 5.

FIG. 5 shows a temporary storage 35 for not returning the oil to an engine room but collecting the oil therein, and FIG. 6 is a partially enlarged view illustrating the construction of the lubricant recovering apparatus equipped with the temporary storage 35.

In case of the construction shown in FIG. 5, a tap should be installed at a bottom point from the exhaust manifold to the tail pipe, like the construction shown in FIG. 3.

FIG. 6 is a view illustrating parts of the lubricant recovering apparatus equipped with the temporary storage 35, in which a tap 31 is connected to a bottom point 8 of the tail pipe, and a first pipe 32 having a certain length is connected to the tap 31 so as to allow an operator to easily work at the tail pipe. A joint member 33 is connected to the lower end of the first pipe 32. The lower end of the first pipe 32 is provided with a threaded portion so as to connect the lower end with an upper portion of the joint member 33. A pipe 33b of the joint member 33 is connected to the first pipe 32 by using a pipe or flexible tube. In case of connecting the joint member 33 by using a flexible tube 33b, unions 33a and 33c are needed for upper and lower portions of the pipe 33b. The unions 33a and 33c are installed on the upper and lower ends of the pipe 33b to connect the first pipe 32 with the second pipe 34. In case of using the flexible tube 33b, bolts are mounted on the upper and lower ends of the pipe to directly connect the first and second pipes 32 and 34.

The temporary storage 35 is connected to the lower end of the second pipe 34. Since the temporary storage 35 should be frequently maintained, it is preferable that the temporary storage is easily attached to or detached from the lower end of the second pipe. Consequently, the temporary storage is spaced apart from the upper portion of the oil reservoir 7 at a desired interval.

Also, in case that the temporary storage 35 is connected to the second pipe 34, it is preferable that a proper support is provided to prevent the temporary storage from being vibrated by the tail pipe which is vibrated when the turbocharger is driven. A temporary storage integrally formed with the second pipe 34 may be connected to the lower end the joint member 33.

The above construction is used in case that returning of the recovered lubricant to the engine is not proper.

With the above description, according to the present invention, the lubricant recovering apparatus can prevent the oil from being discharged outside even though the oil slobbering phenomenon occurs in the diesel engine.

Also, the lubricant recovering apparatus can recycle the oil discharged from the diesel engine to solve an environmental pollution.

The present invention recycles the discharged lubricant, which reduces operation expenses.

In addition, the lubricant recovering apparatus can prevent the periphery of the engine from being polluted by the discharged oil, which eliminates the unpleasant feeling of a driver and reduces a time and cost required to clean the engine.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lubricant recovering apparatus for heavy construction equipment, comprising:
   a tail pipe connected to an engine of the heavy construction equipment for discharging an exhaust gas;
   a tap installed at a bottom point of the tail pipe;
   a first pipe connected to the tap at one end thereof;
   a joint member detachably connected to the other end of the pipe;
   a second pipe mounted on a lower end of the joint member and extending to an interior of an oil reservoir;
   a penetrating portion having a hole formed on an upper portion of the oil reservoir, through which the second pipe passes; and
   a drain port formed on a lower end of the second pipe penetrating the penetrating portion and having a mesh.

2. The lubricant recovering apparatus as claimed in claim 1, wherein the joint member has an upper union, a pipe, and a lower union.

3. The lubricant recovering apparatus as claimed in claim 1, wherein the joint member has a flexible tube having bolt connections at upper and lower portions of the flexible tube.

4. A lubricant recovering apparatus for heavy construction equipment, comprising:
   a tail pipe connected to an engine of the heavy construction equipment for discharging an exhaust gas;
   a tap installed at a bottom point of the tail pipe;
   a first pipe connected to the tap at one end thereof;
   a joint member detachably connected to the other end of the pipe;
   a second pipe mounted on a lower end of the joint member; and
   a temporary storage mounted on a lower end of the second pipe.

5. The lubricant recovering apparatus as claimed in claim 4, wherein the joint member has an upper union, a pipe, and a lower union.

6. The lubricant recovering apparatus as claimed in claim 4, wherein the joint member has a flexible tube having bolt connections at upper and lower portions of the flexible tube.

* * * * *